United States Patent
Okuno

(10) Patent No.: US 7,551,822 B2
(45) Date of Patent: *Jun. 23, 2009

(54) NONLINEAR OPTICAL SIGNAL-TREATING APPARATUS

(75) Inventor: Toshiaki Okuno, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/036,576

(22) Filed: Feb. 25, 2008

(65) Prior Publication Data

US 2008/0226243 A1    Sep. 18, 2008

Related U.S. Application Data

(63) Continuation-in-part of application No. 11/643,942, filed on Dec. 22, 2006.

(30) Foreign Application Priority Data

Dec. 26, 2005    (JP) .............................. 2005-372970

(51) Int. Cl.
G02B 6/02    (2006.01)
G02B 6/32    (2006.01)
G02B 6/255    (2006.01)

(52) U.S. Cl. ............................. 385/122; 385/95; 385/33

(58) Field of Classification Search ....................... None
See application file for complete search history.

(56) References Cited

U.S. PATENT DOCUMENTS 5,761,354 A * 6/1998 Kuwano et al. ............... 385/33

FOREIGN PATENT DOCUMENTS

EP    1 801 643 A1    6/2007

OTHER PUBLICATIONS

European Search Report issued in European Patent Application No. EP 0602697.7-1228 dated Feb. 20, 2008.

Hori, T. et al., "Flatly broadened, wideband and low noise supercontinuum generation in highly nonlinear hybrid fiber," Optics Express Opt. Soc. America USA, vol. 12, No. 2, Jan. 26, 2004.

Westbrook P. S., et al., "US processing of highly nonlinear fibers for enhanced supercontinuum generation," Optical Fiber Communication Conference, 2004, vol. 2, Feb. 2004, pp. 737-739.

Gupta D. et al., "Nonlinear pulse propagation in dispersion decreasing fibers," Optical Communications vol. 237, No. 4-6, Jul. 15, 2005, pp. 309-317.

* cited by examiner

Primary Examiner—Omar Rojas
(74) Attorney, Agent, or Firm—McDermott Will & Emery LLP

(57) ABSTRACT

A nonlinear optical signal-treating apparatus can suppress the distortion of pulse light to be inputted into an optical fiber to an allowable level or less. The apparatus comprises a pulse light source for outputting first pulse light, a first optical fiber, a second optical fiber that is spliced with the first optical fiber and has a mode-field diameter smaller than that of the first optical fiber, and a light-introducing system for inputting the first pulse light into the first optical fiber. The second optical fiber receives the first pulse light and generates second pulse light having a newly produced wavelength. The peak power ratio of the first pulse light outputted from the first optical fiber to that inputted into the first optical fiber and the pulse width ratio of the first pulse light outputted from the first optical fiber to that inputted into the first optical fiber are 0.5 to 1.5.

11 Claims, 8 Drawing Sheets

NONLINEAR OPTICAL SIGNAL-TREATING APPARATUS

This is a continuation-in-part application of application Ser. No. 11/643,942, filed Dec. 22, 2006.

BACKGROUND OF THE INVENTION

1. Field of the Invention

The present invention relates to an optical signal-treating apparatus that utilizes a nonlinear optical phenomenon in optical fiber.

2. Description of the Background Art

When a nonlinear optical phenomenon is produced by inputting high power light into an optical fiber, the optical fiber can generate not only broad-band light (supercontinuum light) but also light having a wavelength different from that of the inputted light. As the effective area of the optical fiber is decreased, and as the nonlinear coefficient in the vicinity of the core is increased, the nonlinear optical phenomenon is intensified. To decrease the effective area, it is necessary to decrease the core diameter in general. On the other hand, to increase the nonlinear coefficient, it is necessary to perform a treatment such as the increasing of the concentration of the germanium oxide ($GeO_2$) and the like to be doped in the core.

An optical fiber having a high nonlinear can produce a nonlinear optical phenomenon with high efficiency. However, this type of fiber has a small core diameter, in general. Therefore, it is difficult to couple the light outputted from the pulse light source to the optical fiber with stability and high efficiency. In particular, when the laser light source produces a spatial output as with a solid laser, if the relative position between the laser light source and the optical fiber varies unstably, then the power of the light traveling over the optical fiber will fluctuate.

It is known that when the power or pulse width of the pulse light to be inputted into the optical fiber varies, the spectral line shape of the broad-band light generated in the optical fiber varies (for example, see a literature written by W. J. Wadsworth et al.: J. Opt. Soc. Am. B/Vol. 19 (2002) p. 2148 and another literature written by A. B. Fedotov et al.: J. Opt. Soc. Am. B/Vol. 19 (2002) p. 2156). When a desired output property is intended to obtain stably from an optical fiber utilizing a nonlinear optical phenomenon, it is necessary to perform a control so that the power and pulse width of the pulse light to be inputted into the optical fiber can be stabilized.

Engineers have been studying the coupling between a laser light source and an optical fiber from various points of view. In particular, a large number of reports have been published on the coupling between a semiconductor laser light source and an optical fiber. Most of these reports study how to couple the high power light outputted from a laser light source to an optical fiber with low power loss. There are no reports that specify the peak power, pulse shape, and spectral line shape of the pulse light to be inputted into a nonlinear optical fiber. In other words, no control has been performed on the condition for inputting the pulse light into a highly nonlinear optical fiber, although the foregoing condition is important to obtain broad-band light and wavelength-converted light both having a desired property.

SUMMARY OF THE INVENTION

An object of the present invention is to offer a nonlinear optical signal-treating apparatus that can suppress the distortion of a pulse light to be inputted into an optical fiber to an allowable level or less.

To attain the foregoing object, the present invention offers a nonlinear optical signal-treating apparatus that comprises a pulse light source for outputting first pulse light into a free space, a first optical fiber having a first end and a second end, a second optical fiber that has an input end that is spliced with the second end of the first optical fiber and has a mode-field diameter smaller than that of the first optical fiber, and a light-introducing optical system for inputting the first pulse light into the first end of the first optical fiber. The second optical fiber receives the first pulse light at the input end so as to guide it and generates second pulse light having a newly produced wavelength by utilizing a nonlinear optical phenomenon so as to output it. In this apparatus, the ratio of the peak power of the first pulse light outputted from the first optical fiber to that of the first pulse light inputted into the first optical fiber is at least 0.5 and at most 1.5, and the ratio of the pulse width of the first pulse light outputted from the first optical fiber to that of the first pulse light inputted into the first optical fiber is at least 0.5 and at most 1.5.

BRIEF DESCRIPTION OF THE DRAWING

FIGS. 7A to 7D are schematic diagrams showing a nonlinear optical signal-treating apparatus in an another embodiment of the present invention, in which FIG. 7A shows an apparatus including a light-introducing optical system which has an aspheric lens, FIG. 7B shows an apparatus including a light-introducing optical system which has only one condenser lens, and FIGS. 7C and 7D show an apparatus including a light-introducing optical system which has a beam expander.

DETAILED DESCRIPTION OF THE INVENTION

Figure 1:
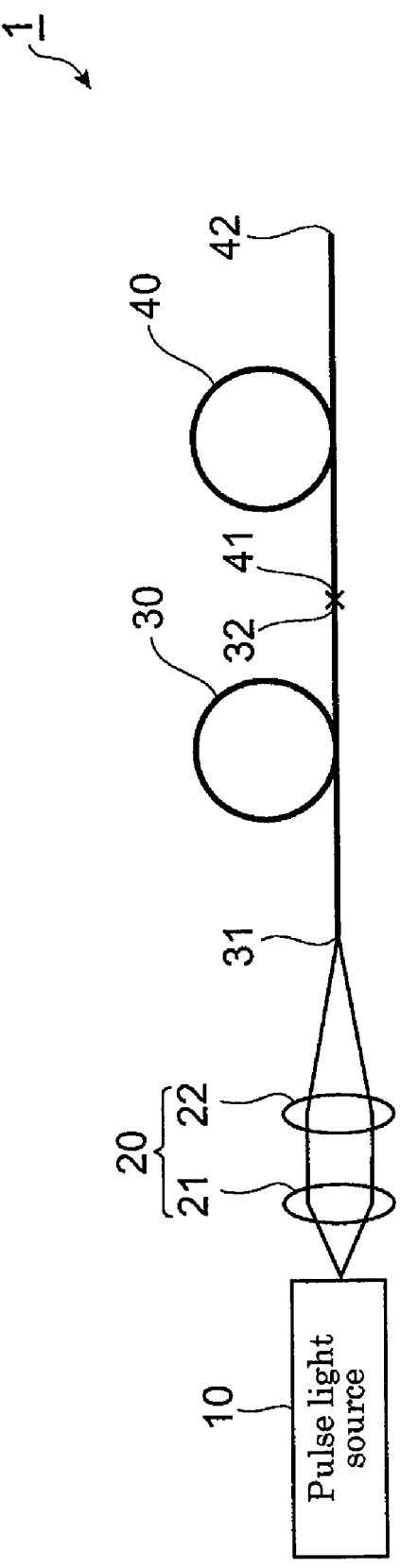
FIG. 1 is a schematic diagram showing a nonlinear optical signal-treating apparatus in an embodiment of the present invention.

Embodiments of the present invention are explained below by referring to the drawing. The drawing is intended to explain the present invention, not to limit the scope of the present invention. In the drawing, the same sign is given to the same element to avoid duplicated explanations. The ratio of the dimensions in the drawing does not necessarily coincide with the actual one.

FIG. 1 is a schematic diagram showing a nonlinear optical signal-treating apparatus 1 in an embodiment of the present invention. A pulse light source 10 outputs pulse light into a free space. A light-introducing optical system 20 comprises a collimating lens 21 and a condensing lens 22 to input the pulse light outputted from the pulse light source 10 into an input end (first end) 31 of a first optical fiber 30. The first optical fiber 30 receives the pulse light at the first end 31 to guide it and outputs it from an output end (second end) 32. The ratio of the peak power of the pulse light outputted from the first optical fiber 30 to that of the pulse light inputted into the first optical fiber 30 is at least 0.5 and at most 1.5. Similarly, the ratio of the pulse width of the pulse light outputted from the first optical fiber 30 to that of the pulse light inputted into the first optical fiber 30 is at least 0.5 and at most 1.5.

An input end 41 of a second optical fiber 40 and the second end 32 of the first optical fiber 30 are spliced by a method such as the fusion splicing. At the wavelength of the pulse light outputted from the pulse light source 10, the second optical fiber 40 has a mode-field diameter smaller than that of the first optical fiber 30. The second optical fiber 40 receives the pulse light outputted from the second end 32 of the first optical fiber 30 to guide it.

In the nonlinear optical signal-treating apparatus 1, pulse light outputted from the pulse light source 10 to a free space is inputted into the first end 31 of the first optical fiber 30 through the light-introducing optical system 20. The pulse light inputted into the first end 31 of the first optical fiber 30 is guided by the first optical fiber 30, is outputted from the second end 32 of the first optical fiber 30 to be inputted into the input end 41 of the second optical fiber 40, and is guided by the second optical fiber 40. In the second optical fiber 40, other pulse light having a newly produced wavelength is generated by utilizing a nonlinear optical phenomenon accompanying the guiding of the pulse light. The pulse light having a newly produced wavelength is outputted from the output end 42 of the second optical fiber 40.

Because the first optical fiber 30 has a mode-field diameter larger than that of the second optical fiber 40, the efficiency of the optical coupling between the pulse light source 10 and the first optical fiber 30 through the light-introducing optical system 20 is stabilized. In addition, because the second end 32 of the first optical fiber 30 and the input end 41 of the second optical fiber 40 are spliced by a method such as the fusion splicing, the efficiency of the optical coupling between the first optical fiber 30 and the second optical fiber 40 is also stabilized. As described above, the first optical fiber 30 is placed between the pulse light source 10 and the second optical fiber 40, and the pulse light is introduced into the second optical fiber 40 without producing a notable difference in shape between the output and input pulse lights in the first optical fiber 30. Thus, desired output light can be generated.

In the nonlinear optical signal-treating apparatus 1, it is more desirable that the above-described ratio of the peak power and the ratio of the pulse width be at least 0.7 and at most 1.3. In this case, the condition of the pulse light to be outputted from the second optical fiber can be predicted with high accuracy directly by using the condition of the pulse light outputted from the pulse light source.

In the nonlinear optical signal-treating apparatus 1, it is desirable that the pulse light to be outputted from the first optical fiber have a peak power and a pulse width both of which have a maximum 24-hour variation rate of at most 50%. Here, the variation rate is defined as 2×((maximum value)−(minimum value))/((maximum value)+(minimum value)). In this case, the apparatus 1 can be used satisfactorily under the lowest level of condition in practical use, such as the use for research and development. In addition, in the nonlinear optical signal-treating apparatus 1, it is also desirable that the pulse light to be outputted from the first optical fiber have a peak power and a pulse width both of which have a maximum seven-day variation rate of at most 50%. In this case, the apparatus 1 can be applied to an actual optical communication network and optical measuring apparatus, for example.

It is desirable that the nonlinear optical signal-treating apparatus 1 have the following features: (a) the first optical fiber has a mode-field diameter, $MFD_1$, of at least 8 µm at a wavelength of 1.55 µm and a fiber length of at least 1 mm and at most 20 m and (b) the second optical fiber has a mode-field diameter, $MFD_2$, of at most 5 µm at a wavelength of 1.55 µm and a fiber length of at least 1 mm and at most 1,000 m. In this case, by having a mode-field diameter, $MFD_1$, of at least 8 µm, the apparatus 1 can increase the coupling efficiency of single-mode pulse light outputted from an ordinary pulse light source to 50% or more. On the other hand, by having a mode-field diameter, $MFD_2$, of at most 5 µ/m, in comparison with the case where an ordinary single-mode fiber is used, the apparatus 1 can achieve a nonlinear increased by a factor of at least four. As a result, an improvement in efficiency in accordance with the increase can be expected.

When the first optical fiber has a fiber length of at least 1 mm and at most 20 m, the minimum limit of the fiber length necessary for the coupling can be secured and the deterioration of the pulse waveform in the first optical fiber can be limited. On the other hand, in the second optical fiber, as the pulse power is increased, the fiber length can be shortened (because the nonlinear optical phenomenon depends on the inputted pulse power and the fiber length). However, an excessive increase in power will create problems such as the burning, damaging, or deteriorating of the fiber due to a local temperature rise or material defects. These problems can be avoided by predetermining the fiber length of the second optical fiber to 1 mm or more. Furthermore, the fiber length of at most 1,000 m can avoid a decrease in the power of the output pulse due to the increase in the transmission loss. In addition, the occurrence of the instability in the outputted pulse light can be concurrently avoided that is caused by the fluctuation of chromatic dispersion, polarization-mode dispersion, and the like along the length of the fiber.

In the nonlinear optical signal-treating apparatus 1, it is desirable that the pulse light to be outputted from the second optical fiber have a spectral 20-dB bandwidth at least five times that of the pulse light outputted from the first optical fiber. In this case, combined with the fact that the influence of the nonlinear optical phenomenon in the first optical fiber can be decreased to a relatively negligible level, a desktop study on the generation of broad-band light can be conducted by considering only the nonlinear optical phenomenon in the second optical fiber. As a result, the design becomes easy.

In the nonlinear optical signal-treating apparatus 1, it is desirable that the splice loss between the first and second optical fibers be at most 1 dB. This condition can avoid a decrease in the effect of the occurrence of the nonlinear optical phenomenon in the second optical fiber.

In the nonlinear optical signal-treating apparatus 1, it is desirable that (a) the first optical fiber have a mode-field diameter of at least 12 µm at a wavelength of 1.55 µm and (b) the propagating pulse light have a single mode. In this case, in comparison with the case where the conventional single-mode optical fiber is used, the coupling efficiency of the optical coupling between the pulse light source 10 and the first optical fiber 30 through the light-introducing optical system 20 can be expected to increase at least 5%. Furthermore, the tolerance for the spatial coupling of the pulse light is improved at least 20%. Therefore, the power variation can be reduced in accordance with the improvement.

In the nonlinear optical signal-treating apparatus 1, it is desirable that the time-bandwidth product of the pulse light to be inputted into each of the first and second optical fibers be at most 0.5. This condition can suppress the generation of noise components. Consequently, the outputting of ideal broad-band light and wavelength-converted light can be achieved.

Figure 2:
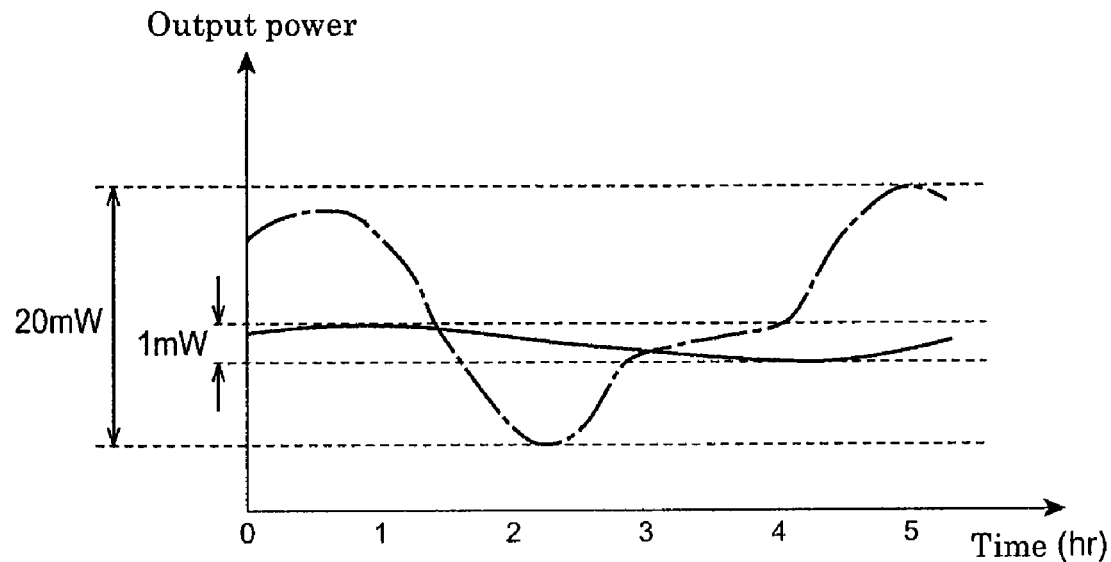
FIG. 2 is a graph showing, in the nonlinear optical signal-treating apparatus shown in FIG. 1, (a) a variation with time in pulse light outputted from the first optical fiber and (b) a variation with time in pulse light outputted from the second optical fiber when the pulse light outputted from the pulse light source is inputted into the second optical fiber without passing through the first optical fiber.

FIG. 2 is a graph showing, in the nonlinear optical signal-treating apparatus 1, (a) a variation with time in pulse light outputted from the first optical fiber 30 and (b) a variation with time in pulse light outputted from the second optical fiber when the pulse light outputted from the pulse light source is inputted into the second optical fiber without passing through the first optical fiber. The pulse light outputted from the pulse light source 10 has a power of 60 mW. In the nonlinear optical signal-treating apparatus 1, the variation with time (shown in a solid line) in the pulse light outputted from the first optical fiber 30 is 1 mW over a five-hour period. On the other hand, when the pulse light outputted from the pulse light source 10 is inputted directly into the second optical fiber 40 without passing through the first optical fiber 30, the variation with time (shown in a chain single-dashed line) in the pulse light outputted from the second optical fiber 40 is 20 mW over the same five-hour period. As shown above, when the pulse light outputted from the pulse light source 10 is inputted directly into the second optical fiber 40, the variation with time in the pulse light outputted from the second optical fiber 40 is large.

Figure 3:
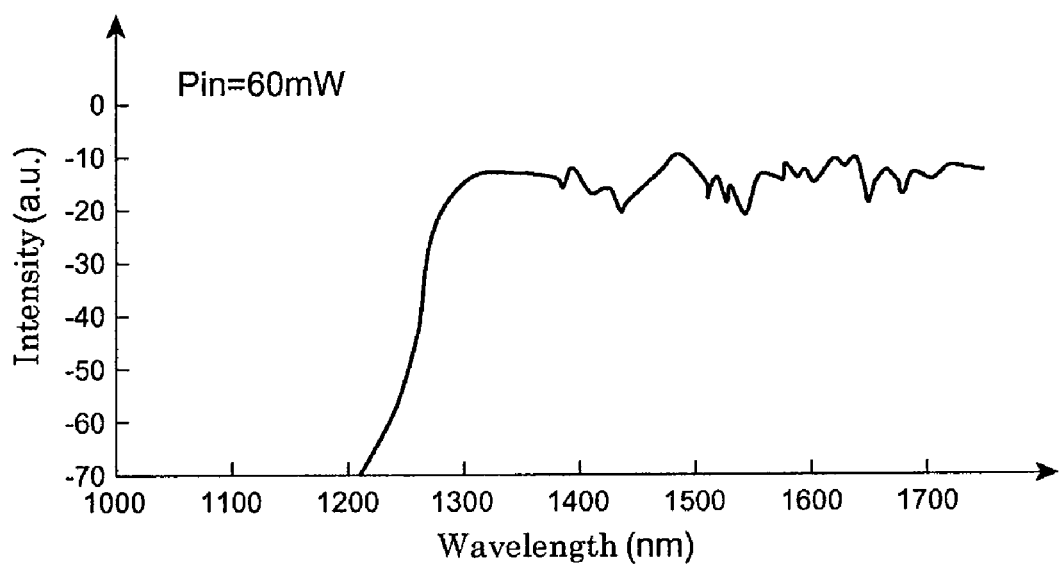
FIG. 3 is a graph showing, in the nonlinear optical signal-treating apparatus shown in FIG. 1, the spectrum of broad-band light outputted from the second optical fiber when the pulse light inputted into the second optical fiber has a power of 60 mW.
Figure 4:
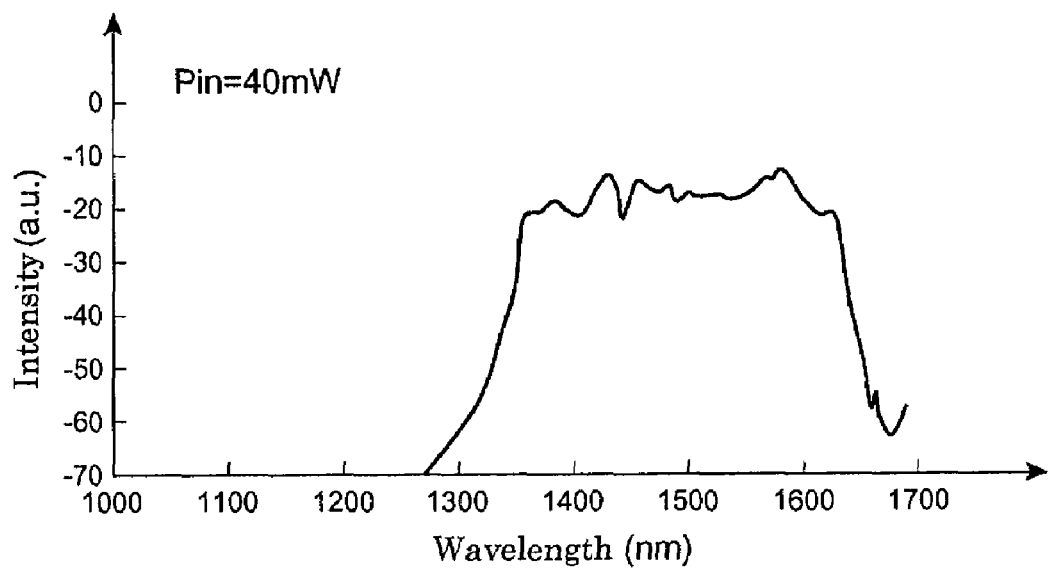
FIG. 4 is a graph showing, in the nonlinear optical signal-treating apparatus shown in FIG. 1, the spectrum of broad-band light outputted from the second optical fiber when the pulse light inputted into the second optical fiber has a power of 40 mW.
Figure 5:
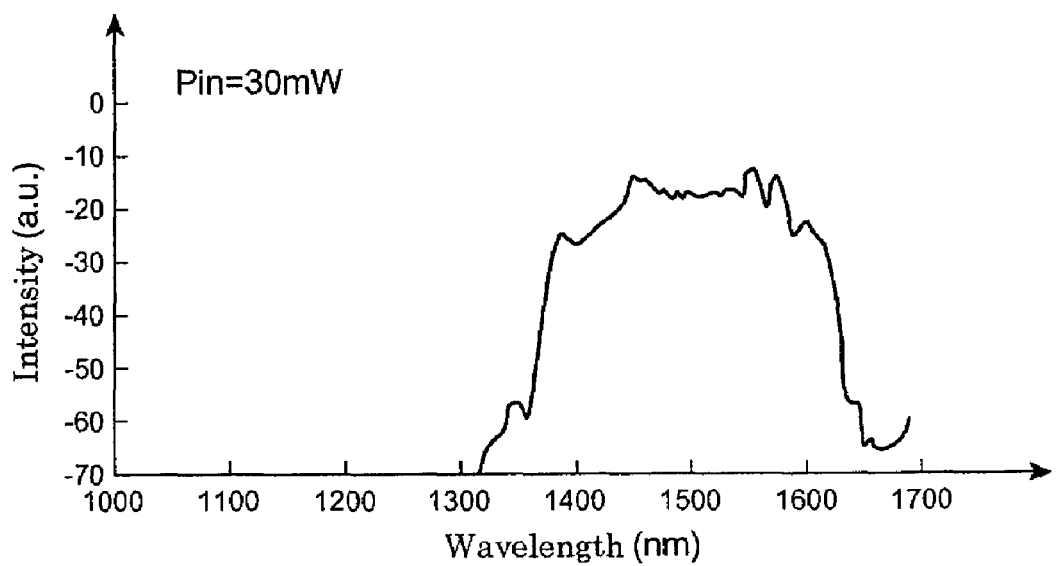
FIG. 5 is a graph showing, in the nonlinear optical signal-treating apparatus shown in FIG. 1, the spectrum of broad-band light outputted from the second optical fiber when the pulse light inputted into the second optical fiber has a power of 30 mW.

FIGS. 3 to 5 are graphs showing, in the nonlinear optical signal-treating apparatus shown in FIG. 1, the spectra of broad-band light (supercontinuum light) outputted from the second optical fiber 40. FIG. 3 shows the case where the pulse light inputted into the second optical fiber 40 has a power of 60 mW. FIG. 4 shows the case where the power is 40 mW and FIG. 5 shows the case where the power is 30 mW. The properties of the second optical fiber 40 used in these cases are shown in Table I.

TABLE I

|  | Unit | Optical fiber 30 | Optical fiber 40 |
| --- | --- | --- | --- |
| Fiber loss at 1.55 µm | dB/km | 0.2 | 0.55 |
| Chromatic dispersion at 1.55 µm | ps/nm/km | 17 | −0.27 |
| Dispersion slope at 1.55 µm | ps/nm$^2$/km | 0.06 | −0.0024 |
| Effective area at 1.55 µm | µm$^2$ | 85 | 16.4 |
| Mode-field diameter at 1.55 µm | µm | 10.3 | 4.6 |
| Cutoff wavelength | nm | 1,280 | 984 |
| Polarization-mode dispersion at 1.55 µm | ps/km$^{0.5}$ | 0.05 | 0.03 |
| Fiber length | m | 0.5 | 10 |

As shown in FIG. 3, in the case where the pulse light has a power of 60 mW, the broad-band light outputted from the second optical fiber 40 has a wavelength range of 1,300 nm to 1,700 nm or more. This wavelength range covers the entire range of the optical communication band. Consequently, this case can not only be applied to the evaluation of various components and apparatuses, such as optical components for the 1.3- and 1.55-µm use, but also be used for a communication-use light source, a wavelength-variable light source, a sensor-use light source, and the like.

As shown in FIG. 4, when the pulse light has a power of 40 mW (in other words, when the power of the pulse light is decreased by about 30%), the broad-band light outputted from the second optical fiber 40 has a wavelength range of 1,400 to 1,700 nm. This wavelength range cannot cover the entire range of the communication wavelength band. In particular, as a light source for the 1.3-µm band, because the intensity is decreased by more than 50 dB, it is clear that the light source cannot be used absolutely.

As shown in FIG. 5, when the pulse light has a power of 30 mW (in other words, when the power of the pulse light is decreased by about 50%), the broad-band light outputted from the second optical fiber 40 has a wavelength range of 1,500 to 1,600 nm. At the wavelength in the vicinity of 1,400 nm and at 1,600 nm or more, a decrease in intensity is observed. When the power is decreased to this level, the nonlinear optical signal-treating apparatus 1 cannot be used as a broad-band light source any more, becoming a device comparable to a light-emitting diode and the like.

Figure 6:
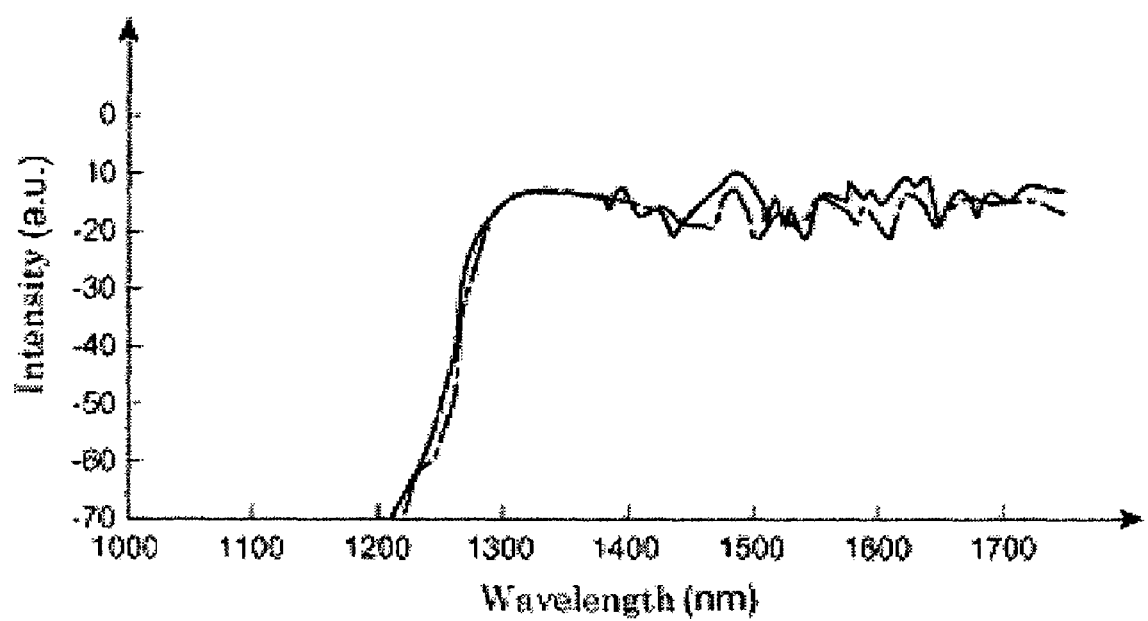
FIG. 6 is a graph showing, in the nonlinear optical signal-treating apparatus shown in FIG. 1, spectra of lights outputted from the second optical fiber.

FIG. 6 is a graph showing, in the nonlinear optical signal-treating apparatus 1, spectra of light outputted from the second optical fiber 40. FIG. 6 shows spectra at two different times. Table I shows the properties of the first optical fiber 30 and the second optical fiber 40 used in this case. The spectrum shown in a solid line was obtained when the power inputted into the second optical fiber 40 was 60 mW. The spectrum shown in a chain single-dashed line was obtained when the power inputted into the second optical fiber 40 was 59 mW. By providing the first optical fiber 30, the variation in the power of light inputted into the second optical fiber 40 can be suppressed to 1 mW or less. Consequently, as shown in FIG. 6, the variation in the spectrum of light outputted from the second optical fiber 40 can be suppressed. As a result, a light source for evaluating the entire range of the optical communication band can be obtained stably.

It is desirable that as the first optical fiber, an optical fiber 30' shown in Table II be used that has a further increased mode-field diameter. By using the optical fiber 30' having an increased mode-field diameter, the amount of the variation in the output power of the first optical fiber can be suppressed to 1 mW or less. Furthermore, it is desirable that as the second optical fiber, an optical fiber 40' shown in Table II be used that has a further increased nonlinearity (nonlinearity coefficient, γ: 20 W$^{-1}$ km$^{-1}$). The use of the above-described optical fiber 40' having a length of, for example, 2 m enables the production of a spectrum comparable to that shown in FIG. 6.

TABLE II

|  | Unit | Optical fiber 30' | Optical fiber 40' |
| --- | --- | --- | --- |
| Fiber loss at 1.55 µm | dB/km | 0.17 | 0.7 |
| Chromatic dispersion at 1.55 µm | ps/nm/km | 20 | 0.0 |
| Dispersion slope at 1.55 µm | ps/nm$^2$/km | 0.06 | 0.03 |
| Effective area at 1.55 µm | µm$^2$ | 115 | 11 |
| Mode-field diameter at 1.55 µm | µm | 12.2 | 3.8 |
| Cutoff wavelength | nm | 1,460 | 1,200 |
| Polarization-mode dispersion at 1.55 µm | ps/km$^{0.5}$ | 0.04 | 0.08 |
| Fiber length | m | 0.5 | 2 |

Figure 7A:
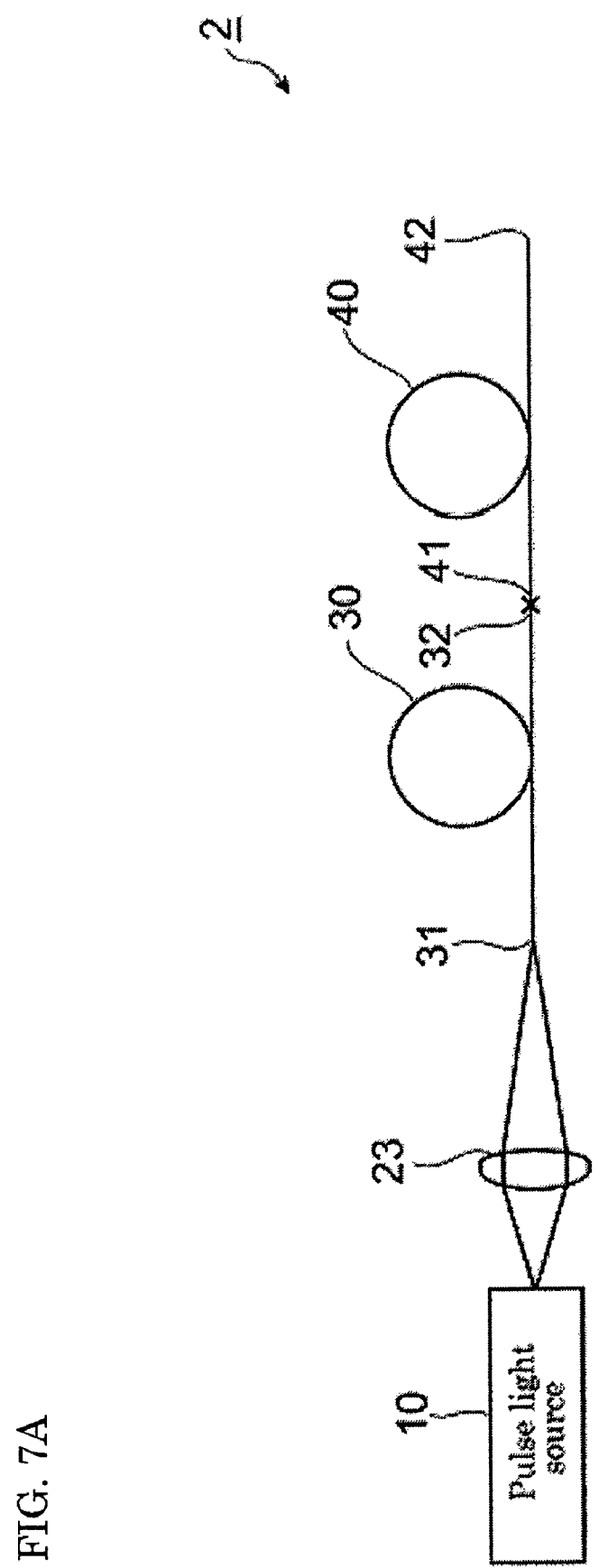

FIGS. 7A to 7D are schematic diagrams showing a nonlinear optical signal-treating apparatus in another embodiment of the present invention, in which FIG. 7A shows a nonlinear optical signal-treating apparatus 2 including a light-introducing optical system which has an aspheric lens 23. The aspheric lens 23 inputs pulse light outputted from a pulse light source 10 into an input end 31 of a first optical fiber 30. In the apparatus 2, Seidel aberrations, which is a kind of monochromatic aberrations, as well as chromatic aberration, which is caused by a broadband spectrum of the pulse light, can be suppressed and high efficient coupling between the pulse light source 10 and the first optical fiber 30 can be achieved.

Figure 7B:
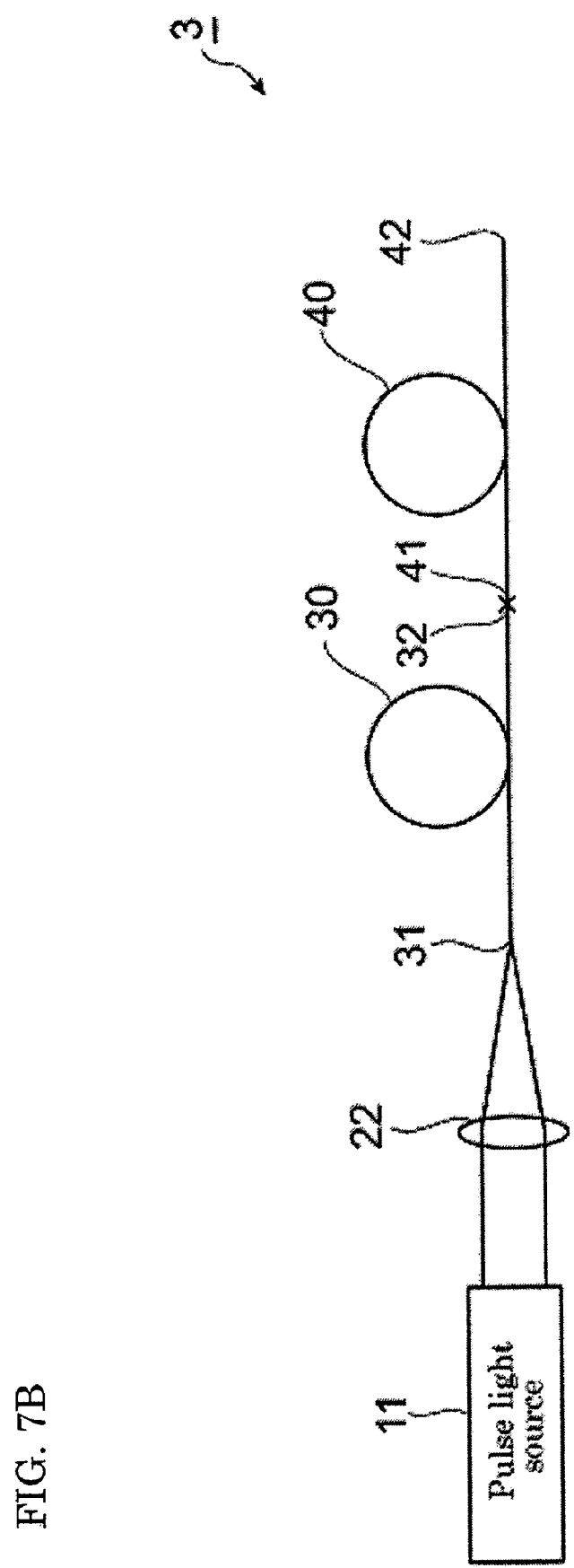

FIG. 7B shows a nonlinear optical signal-treating apparatus 3 including a pulse light source 11 which outputs pulse light as a collimated ray and a light-introducing optical system which has only one condenser lens (condensing lens) 22. In the apparatus 3, a light-introducing optical system has a simple construction and the condenser lens 22 inputs the pulse light into an input end 31 of a first optical fiber 30. The lens 22 may be a spherical lens or aspheric lens.

Figure 7C:
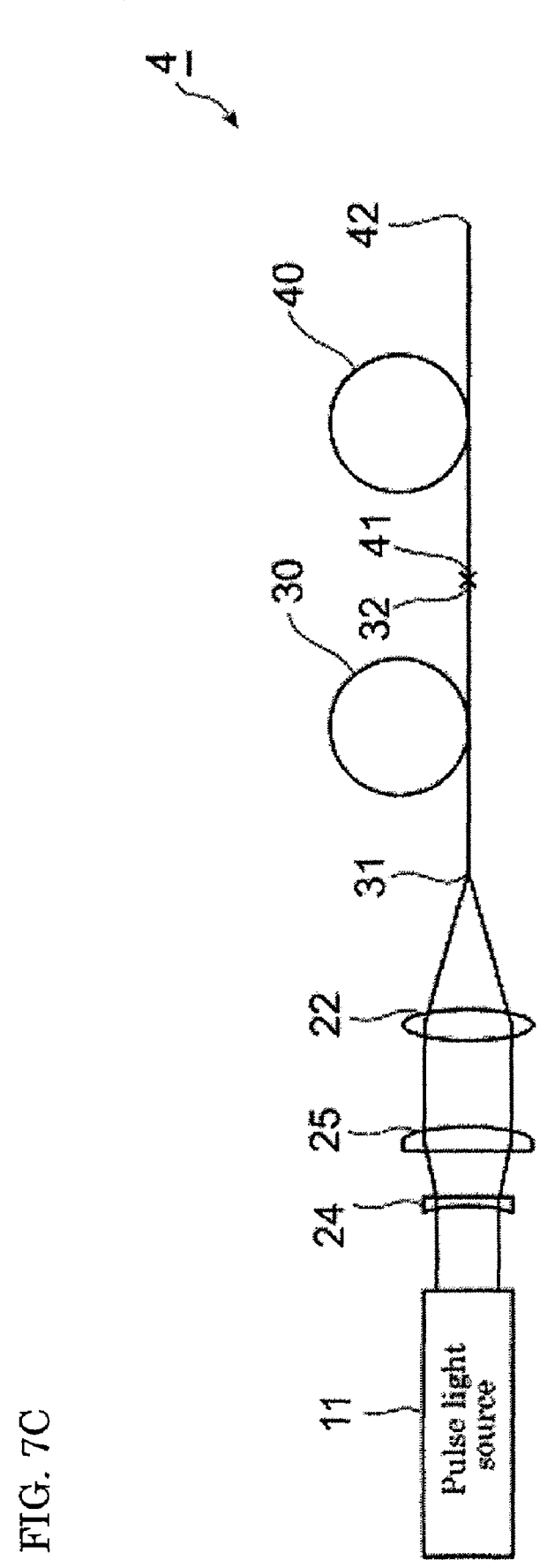
Figure 7D:
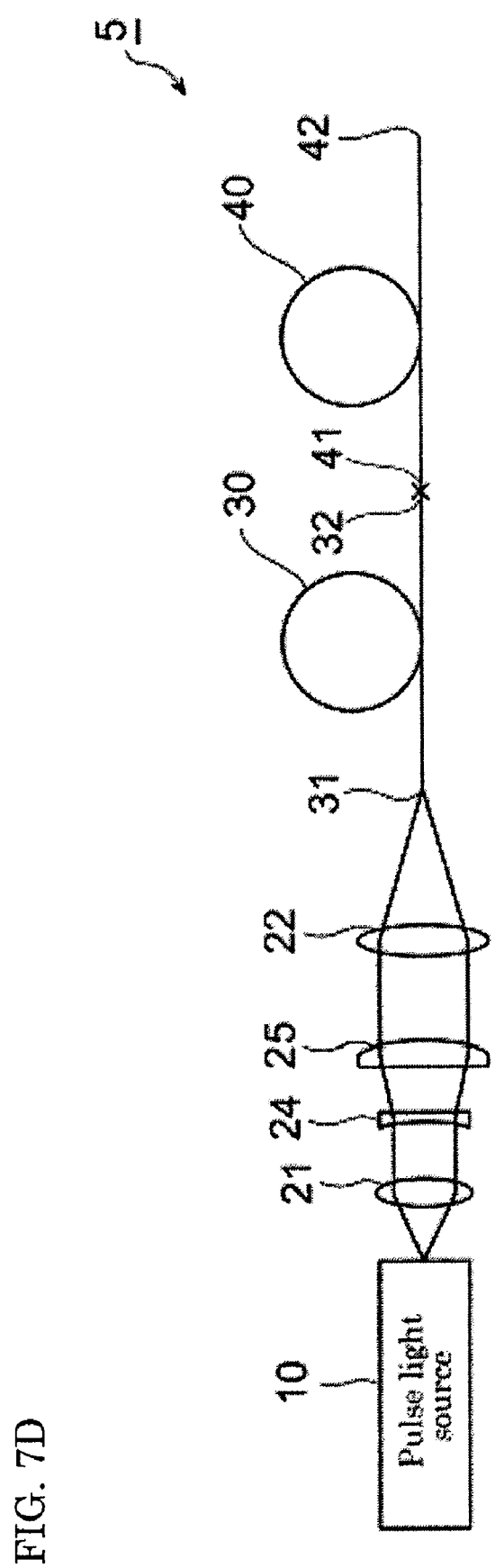

FIGS. 7C and 7D show a nonlinear optical signal-treating apparatus including a light-introducing optical system which has a beam expander. In the nonlinear optical signal-treating apparatus 4, the beam expander is a Galilean type consisting of a concave lens 24 and convex lens 25 and disposed between a pulse light source 11 and a condenser lens 22. A Keplerian type beam expander consisting of two convex lenses can be used instead of the Galilean type beam expander. In the apparatus 5, a pulse light source 10 outputs pulse light as a divergent ray and a light-introducing optical system further includes a collimation lens 21. The light-introducing optical system having a beam expander can focus the pulse light into a small area and light coupling between the pulse light source 10 or 11 and the first optical fiber 30 will be easy. Of course, lenses of the light-introducing optical system are not strictly limited. For example, one compound lens can be used instead of concave lens 24 and convex lens 25 in apparatus 4.

In a nonlinear optical signal-treating apparatus according to the present invention, a pulse light source may have the following properties, that is, center wavelength of pulse light, repetition frequency of pulse light, output power, and pulse width of the pulse light.

TABLE III

|  | Example 1 | Example 2 | Example 3 | Example 4 |
|---|---|---|---|---|
| Center wavelength nm | 1550 | 1550 | 1060 | 1260 |
| Repetition frequency MHz | 50 | 1 | 50 | 50 |
| Output power mW | 80 | 100 | 100 | 50 |
| Pulse width fs | 300 | 2000 | 1000 | 300 |

The pulse light source may be a solid-state laser, such as a titanium-sapphire laser, a micro-chip laser, and a fiber laser. The micro-chip laser and the fiber laser may contain Ytterbium. In addition, the pulse light source based on high order harmonic generation or optical parametric effect can be applicable.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2005-372870 filed on Dec. 26, 2005 including the specification, claims, drawing, and summary is incorporated herein by reference in its entirety.

What is claimed is:

1. A nonlinear optical signal-treating apparatus, comprising:
   (a) a pulse light source for outputting first pulse light into a free space;
   (b) a first optical fiber having a first end and a second end;
   (c) a second optical fiber that
      (c1) has an input end that is spliced with the second end of the first optical fiber;
      (c2) has a mode-field diameter smaller than that of the first optical fiber;
      (c3) receives the first pulse light at the input end so as to guide it; and
      (c4) generates second pulse light having a newly produced wavelength by utilizing a nonlinear optical phenomenon so as to output it; and
   (d) a light-introducing optical system comprising an aspheric lens, for inputting the first pulse light into the first end of the first optical fiber;
   the ratio of the peak power of the first pulse light outputted from the first optical fiber to that of the first pulse light inputted into the first optical fiber being at least 0.5 and at most 1.5 and the ratio of the pulse width of the first pulse light outputted from the first optical fiber to that of the first pulse light inputted into the first optical fiber being at least 0.5 and at most 1.5, wherein:
   the first optical fiber has a mode-field diameter of at least 8 μm at a wavelength of 1.55 μm.

2. A nonlinear optical signal-treating apparatus, comprising:
   (a) a pulse light source for outputting first pulse light into a free space;
   (b) a first optical fiber having a first end and a second end;
   (c) a second optical fiber that
      (c1) has an input end that is spliced with the second end of the first optical fiber;
      (c2) has a mode-field diameter smaller than that of the first optical fiber;
      (c3) receives the first pulse light at the input end so as to guide it; and
      (c4) generates second pulse light having a newly produced wavelength by utilizing a nonlinear optical phenomenon so as to output it; and
   (d) a light-introducing optical system consisting of one condensing lens, for inputting the first pulse light into the first end of the first optical fiber;
   the ratio of the peak power of the first pulse light outputted from the first optical fiber to that of the first pulse light inputted into the first optical fiber being at least 0.5 and at most 1.5 and the ratio of the pulse width of the first pulse light outputted from the first optical fiber to that of the first pulse light inputted into the first optical fiber being at least 0.5 and at most 1.5, wherein:
   the first optical fiber has a mode-field diameter of at least 8 μm at a wavelength of 1.55 μm.

3. A nonlinear optical signal-treating apparatus, comprising:
   (a) a pulse light source for outputting first pulse light into a free space;
   (b) a first optical fiber having a first end and a second end;
   (c) a second optical fiber that
      (c1) has an input end that is spliced with the second end of the first optical fiber;
      (c2) has a mode-field diameter smaller than that of the first optical fiber;
      (c3) receives the first pulse light at the input end so as to guide it; and
      (c4) generates second pulse light having a newly produced wavelength by utilizing a nonlinear optical phenomenon so as to output it; and
   (d) a light-introducing optical system comprising a beam expander, for inputting the first pulse light into the first end of the first optical fiber;
   the ratio of the peak power of the first pulse light outputted from the first optical fiber to that of the first pulse light inputted into the first optical fiber being at least 0.5 and at most 1.5 and the ratio of the pulse width of the first pulse light outputted from the first optical fiber to that of the first pulse light inputted into the first optical fiber being at least 0.5 and at most 1.5, wherein:
   the first optical fiber has a mode-field diameter of at least 8 μm at a wavelength of 1.55 μm.

4. A nonlinear optical signal-treating apparatus as defined by claims 1, 2 or 3, wherein
the ratio of the peak power is at least 0.7 and at most 1.3 and the ratio of the pulse width is at least 0.7 and at most 1.3.

5. A nonlinear optical signal-treating apparatus as defined by claims 1, 2 or 3, wherein
the first pulse light outputted from the first optical fiber has a peak power and a pulse width both of which have a maximum 24-hour variation rate of at most 50%.

6. A nonlinear optical signal-treating apparatus as defined by claims 1, 2 or 3, wherein
the first pulse light outputted from the first optical fiber has a peak power and a pulse width both of which have a maximum seven-day variation rate of at most 50%.

7. A nonlinear optical signal-treating apparatus as defined by claims, 1, 2 or 3, wherein:
the first optical fiber has a fiber length of at least 1 mm and at most 20 m and the second optical fiber has a mode-field diameter of at most 5 µm at a wavelength of 1.55 µm and a fiber length of at least 1 mm and at most 1,000 m.

8. A nonlinear optical signal-treating apparatus as defined by claims 1, 2 or 3, wherein
the second pulse light to be outputted from the second optical fiber has a spectral 20-dB bandwidth at least five times that of the first pulse light outputted from the first optical fiber.

9. A nonlinear optical signal-treating apparatus as defined by claims 1, 2 or 3, wherein
the spliced portion between the first and second optical fibers has a splice loss of at most 1dB.

10. A nonlinear optical signal-treating apparatus as defined by claims 1, 2 or 3, wherein:
the first optical fiber has a mode-field diameter of at least 12 µm at a wavelength of 1.55 µm and the first pulse light propagating over the first optical fiber has a single mode.

11. A nonlinear optical signal-treating apparatus as defined by claims 1, 2 or 3, wherein the first pulse light to be inputted into each of the first and second optical fibers has a time-bandwidth product of at most 0.5.

* * * * *